Sept. 9, 1958
F. A. PACHMAYR
2,850,781
FASTENING DEVICE
Filed July 20, 1953
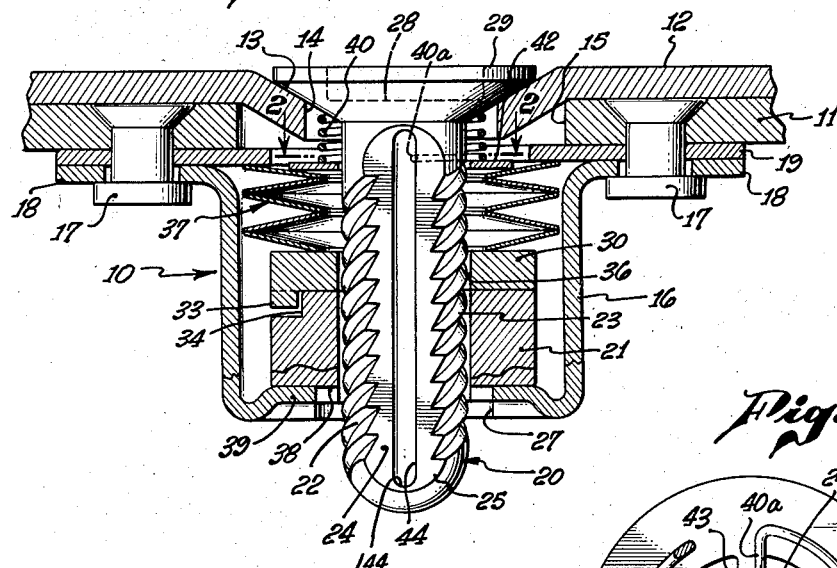
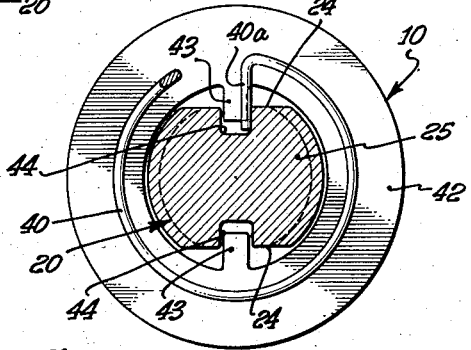
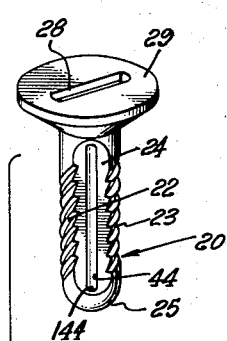
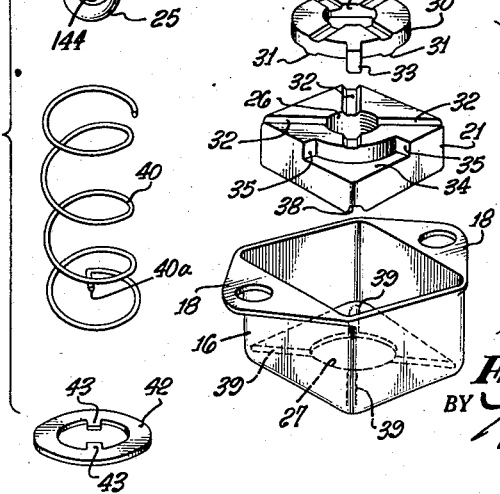
INVENTOR.
FRANK A. PACHMAYR
BY
ATTORNEY.

United States Patent Office 2,850,781
Patented Sept. 9, 1958

2,850,781

FASTENING DEVICE

Frank A. Pachmayr, Culver City, Calif., assignor to Airtek Dynamics, Inc., Los Angeles, Calif., a corporation of California Application July 20, 1953, Serial No. 368,995

2 Claims. (Cl. 24—221)

This invention has to do generally with improvements in quick make and break fasteners useable for releasably attaching together work members of various forms, and especially for the connection of metallic sheet members used in airplaine fabrication. As a typical adaptation, the invention is hereinafter described as embodied in a type of fastener comprising a nut part attachable to an inner member, e. g. a metallic sheet, and an interrupted threaded stud received through an opening in an outer member or sheet and engageable with the nut to releasably hold the work parts together.

It will suffice to state preliminarily with respect to the general characteristics of the stud and nut parts, that they may have any of different specific forms and constructions permitting their interlocking association, by virtue of the interrupted threads of both the stud and nut, upon axial insertion and then limited angular rotation of the stud within the nut. As illustrative, the invention may be embodied in a particular fastener structure of the type more particularly dealt with as to the stud and nut interengagement in a copending application of John Gerick entitled "Interrupted Thread Type Fasteners," filed on even date herewith.

Disengagement of the fastener parts from their interlocking condition results from rotation of the stud to a position withdrawing the stud threads from the nut threads, freeing the stud for axial movement or withdrawal out of the nut. The stud head frequently being countersunk within the outer work member or sheet, it may be desirable upon release of the stud from the nut, to render the stud more accessible and easily removable by incorporating in the fastener a coil spring surrounding the stud and exerting against it a thrust tending to project the stud out of the work. A particular problem has arisen in connection with assuring proper accommodation of the "pop out" spring within the fastener, and specifically in preventing the spring upon rotation of the stud during repeated engagement of the fastener parts, from tending to turn and advance into the fastener parts, and to an ultimate condition at which the spring becomes so lodged as to interfere with its own proper operation or that of the other fastener parts.

The primary object of the present invention is to provide a simple and eminently practical expedient for assuring retention of the stud projecting spring at all times in a proper and workable condition with relation to the associated parts of the fastener. As will appear, this object is accomplished in a simple, low cost and practical manner by forming within one or both sides of the stud where the threads are interrupted, and usually within one or opposed flat faces on the stud a recess for reception of the inner end of the spring. The latter is so formed as to turn into the recess so that at all times the inner terminal of the spring is so retained within the recess as not to be releasable therefrom in response to any turning movements of the stud.

The particular details of an illustrative embodiment of the invention will be understood more fully and to best advantage from the following detailed description of the accompanying drawing, in which:

Fig. 1 is a view showing the fastener assembly in axial section, the stud appearing in side elevation;

Fig. 2 is a cross-section on line 2—2 of Fig. 1;

Fig. 3 is a view showing in perspective the stud, ejector spring and washer parts; and Fig. 4 is a similar view illustrative of the receptacle, nut, and cam disc shapes.

As a typical embodiment, the invention is shown in conjunction with a fastener assembly generally indicated at 10 used to releasably interconnect a pair of work sheets or panels 11 and 12, the latter having a countersink 13 and an opening 14 alined with the inner work sheet opening 15. The nut section of the fastener assembly comprises a receptacle 16 attached to the sheet 11 by rivets 17 extending through openings in the receptacle ears 18. A spacer plate 19 usually is interposed between the receptacle and the work sheet.

As a typical means for releasably engaging the stud 20 within the receptacle contained parts, the stud is shown to be inserted through a nut 21 which, like the receptacle, is of polygonal cross-section, the stud and nut having diametrically opposed, interrupted thread series 22 and 23, respectively, the stud threads being interrupted by flats 24 on opposite faces of the shank 25, and the nut threads being interrupted by smooth extents 26 of the nut bore between the threads 23. Thus the stud may be inserted axially through the nut and the bottom opening 27 in the receptacle, and engaged with the nut threads by right-hand rotation of the stud, as by a tool inserted within a driver slot 28 in the stud head 29.

The stud is releasably held against rotation relative to the nut as at quarter turn intervals, by a detenting disc 30 having on its underface projections or lugs 31 receivable within recesses 32 in the top face of the nut. The disc carries a depending lug 33 which is received within an arcuate recess 34 in the nut, the projection 33 being engageable against the end shoulders 35 of the recess to limit the range of relative rotation between the parts. The detenting disc 30 has a non-circular opening 36 through which the stud shank is inserted, the opening corresponding in cross-sectional shape with the shank so that the two parts rotate together. The detenting disc 30 is urged against the nut 21 and the nut against the bottom of the receptacle 16 by spring 37 of the multiple frustroconical disc type confined between the disc and the spacer plate 19.

While any suitable provision may be made for assuring alinement and mating of the stud and nut threads, I have shown as typical the means employed and more particularly dealt with in the aforesaid John Gerick application. For present purposes it will suffice to describe briefly the thread alining means as contemplating shaping the interengaging faces of the nut and receptacle so that the parts have camming relation upon rotation of the nut and act to displace the nut axially of the stud. Such surfaces may be formed by providing within the bottom face of the nut radial recesses 38 receiving projections or lugs 39 on the receptacle. Upon its rotation the nut is cammed by projections 39 so that any initial misalinement between the nut and stud threads is converted to accurate alining and mating positions thereof as a result of a shifting of the nut.

The invention is more particularly concerned with the accommodation of a coil spring 40 which is used to eject the stud partially out of the receptacle parts upon rotation of the stud to releasing position. The spring is shown to be confined in the made-up condition of the fastener, to bear upwardly against the stud head 29, the bottom of the spring being supported upon a washer 42 having projections 43, see Fig. 2, received within longitudinal recesses 44 extending within and substantially the full length of the stud flats 24. As previously explained, upon repeated rotations of the stud, the lower end of the spring unless specially confined, may tend to work down into the receptacle, as where in any situation the spring terminal might enter between the shank threads. Complete assurance of proper positioning and confinement of the spring is given by forming the lower spring terminal, as Fig. 2 illustrates, with an in-turned portion 40a which is received within one of the shank grooves 44. The spring is maintained centered in relation to the stud by engagement with the tapered underface of the head 29 and the terminal 40a remains confined within the shank grooves at all positions which the lower end of the spring may have in relation to the shank because of the elongated extent of the groove. When the end 40a of the spring is confined in this way within groove 44, that end of the spring obviously cannot possibly work its way past washer 42 and into the receptacle.

As will be apparent, the washer 42 acts to prevent complete detachment of stud 20 from outer work member 12, by reason of the reception of the work member between the head of the stud and washer 42, and since tabs 43 of the washer are engageable with end walls 144 at the ends of grooves 44 which are farthest from head 29, to prevent detachment of the washer from the stud. At the same time, the stud can move axially relative to the washer because of the axial elongation of the recesses 44 within which tabs 43 are received.

I claim:

1. A fastener structure comprising a receptacle adapted to be secured to one of a pair of work members to be joined by the fastener, a rotatable headed stud insertible into the receptacle through an opening in the outer work member, said stud having interrupted screw thread series, a nut in said receptacle having interrupted screw thread series engageable and disengageable by the stud threads upon rotation of the stud in opposite directions to connect and disconnect the work members, the stud being displaceable outwardly of said receptacle in its disengaged condition, said stud having a recess extending along one side thereof between said two thread series, an element disposed about said stud for retaining it on said outer work member and having a projection extending into said recess, and a coil spring surrounding the stud between its head and said element and operable to project the stud outwardly from the receptacle, said spring having an inner end turned toward the interior of the coil and received within and movable axially along said recess in the side of the stud, said recess being enclosed sufficiently to confine said projection against movement out of the recess, and the end of the recess which is farthest from the stud head terminating in an end wall which is engageable by said projection to limit relative axial separating movement of the stud and said element.

2. A fastener structure as recited in claim 1 in which said stud has two flats extending along opposite sides thereof and containing two of said recesses extending axially of the stud, said element having two of said projections extending inwardly into and retained within said two recesses respectively.

References Cited in the file of this patent
UNITED STATES PATENTS

| | | |
|---|---|---|
| 2,095,271 | Swanstrom | Oct. 12, 1937 |
| 2,382,973 | Cannova | Aug. 21, 1945 |
| 2,392,718 | Baldwin | Jan. 8, 1946 |
| 2,410,441 | Hattan | Nov. 5, 1946 |
| 2,416,873 | Gorfin | Mar. 4, 1947 |
| 2,442,064 | Veit | May 25, 1948 |
| 2,542,968 | Zahodiakin | Feb. 20, 1951 |
| 2,575,311 | Barry | Nov. 13, 1951 |